(12) United States Patent
 Stiesdal

(10) Patent No.: US 11,313,402 B2
(45) Date of Patent: Apr. 26, 2022

(54) PROTECTION SYSTEM FOR A THREADED FASTENER AND A METHOD FOR INSTALLATION, INSPECTION AND MAINTENANCE OF SUCH PROTECTION SYSTEM

(71) Applicant: Stiesdal Offshore Technologies A/S, Give (DK)

(72) Inventor: Henrik Stiesdal, Odense C (DK)

(73) Assignee: STIESDAL OFFSHORE TECHNOLOGIES A/S, Odense C (DK)

( * ) Notice: Subject to any disclaimer, the term of this patent is extended or adjusted under 35 U.S.C. 154(b) by 168 days.

(21) Appl. No.: 16/328,310

(22) PCT Filed: Aug. 30, 2017

(86) PCT No.: PCT/DK2017/050277
 § 371 (c)(1),
 (2) Date: Feb. 26, 2019

(87) PCT Pub. No.: WO2018/041318
 PCT Pub. Date: Mar. 8, 2018

(65) Prior Publication Data
 US 2019/0211865 A1 Jul. 11, 2019

(30) Foreign Application Priority Data
 Aug. 30, 2016 (DK) .......................... PA 2016 70663

(51) Int. Cl.
 *F16B 37/14* (2006.01)
 *F16B 33/00* (2006.01)
 *G01M 3/02* (2006.01)

(52) U.S. Cl.
 CPC ............ *F16B 37/14* (2013.01); *F16B 33/008* (2013.01); *G01M 3/02* (2013.01)

(58) Field of Classification Search
 CPC ....... F16B 37/14; F16B 33/004; F16B 33/008
 (Continued)

(56) References Cited

U.S. PATENT DOCUMENTS 2,456,234 A * 12/1948 Young ..................... F16B 37/14
 285/94
3,457,823 A * 7/1969 Dillon ................... F16B 33/004
 411/366.1
(Continued)

FOREIGN PATENT DOCUMENTS

DE     968193 C     1/1958
DE     3642537 A1   6/1988
(Continued)

OTHER PUBLICATIONS

Supplementary European Search Report dated Apr. 22, 2020 for EP 17 84 5581.
(Continued)

*Primary Examiner* — Flemming Saether
(74) *Attorney, Agent, or Firm* — Schmeiser, Olsen & Watts, LLP

(57) ABSTRACT

A protection system for a threaded fastener is provided. The system includes a threaded fastener, a sleeve and either two end caps, or one end cap and one threaded hole in a component. To avoid exposure to severely corrosive environments the sleeve and either the two end caps, or the one end cap and the one threaded hole, together form an enclosure around the threaded fastener. The enclosure forms a cavity which is completely sealed from the environment. Furthermore, methods are described for mounting, inspection and maintenance of such protection system.

14 Claims, 7 Drawing Sheets

(58) Field of Classification Search
USPC .......................................... 411/372.6–373, 377
See application file for complete search history.

(56) References Cited

U.S. PATENT DOCUMENTS

| | | | |
|---|---|---|---|
| 4,117,643 A | 10/1978 | Lamothe | |
| 4,400,123 A | 8/1983 | Dunegan | |
| 4,784,555 A * | 11/1988 | Cantrell | F16B 37/14 403/372 |
| 4,934,887 A * | 6/1990 | Sharp | F16B 33/004 411/339 |
| 4,992,004 A | 2/1991 | Haug | |
| 5,175,665 A * | 12/1992 | Pegg | B64D 45/02 244/1 A |
| 6,135,691 A * | 10/2000 | Nadarajah | F16B 37/14 411/372.6 |
| 6,654,436 B2 * | 11/2003 | Marra | F16B 37/14 376/260 |
| 9,550,194 B2 * | 1/2017 | Hayashi | C23C 16/00 |
| 2004/0148882 A1 | 8/2004 | Hayes | |
| 2008/0214047 A1 | 9/2008 | Hain et al. | |
| 2010/0251661 A1 * | 10/2010 | Illgner | F16B 37/14 52/698 |
| 2010/0300035 A1 | 12/2010 | Pither | |
| 2012/0114448 A1 * | 5/2012 | Liu | F16B 37/14 411/386 |

FOREIGN PATENT DOCUMENTS

| | | |
|---|---|---|
| EP | 0384103 A1 | 8/1990 |
| EP | 2339094 A1 | 6/2011 |
| WO | 9729289 A1 | 8/1997 |
| WO | WO9729289 A1 | 8/1997 |
| WO | 2010055961 A1 | 5/2010 |
| WO | WO2010055961 A1 | 5/2010 |

OTHER PUBLICATIONS

International Search Report—PCT/DK2017/050277.
Written Opinion—PCT/DK2017/050277.
Danish Search Report dated Mar. 1, 2017 for Application PA 2016 70663.

* cited by examiner

US 11,313,402 B2

PROTECTION SYSTEM FOR A THREADED FASTENER AND A METHOD FOR INSTALLATION, INSPECTION AND MAINTENANCE OF SUCH PROTECTION SYSTEM

CROSS-REFERENCE TO RELATED APPLICATIONS

This application claims priority to PCT Application No. PCT/DK2017/050277, having a filing date of Aug. 30, 2017, which is based on DK Application No. PA 2016 70663, having a filing date of Aug. 30, 2016, the entire contents both of which are hereby incorporated by reference.

FIELD OF TECHNOLOGY

The following relates to a protection system for a threaded fastener, and installation and maintenance methods for such protection system.

More specific, the invention concerns a protection system for a threaded fastener comprising a threaded fastener, a sleeve and either two end caps, or one end cap and one threaded hole in a component. Said sleeve and either the two end caps, or the one end cap and the one threaded hole, together form an enclosure around the threaded fastener. Said protection system completely seals the threaded fastener from the environment.

Moreover, embodiments of the invention concern a method for the installation of a protection system for a threaded fastener comprising a threaded fastener, a sleeve and either two end caps, or one end cap and one threaded hole in a component. Said protection system completely seals the threaded fastener from the environment.

Moreover, embodiments of the invention concern a method for the inspection and maintenance of a protection system for a threaded fastener comprising a threaded fastener, a sleeve and either two end caps, or one end cap and one threaded hole in a component. Said protection system completely seals the threaded fastener from the environment.

BACKGROUND

The following relates generally to the field of threaded fastener connections, and more particularly to threaded fastener connections sealed against environmental corrosion and degradation.

Machines and structures are often assembled from elements that must be joined together to be operable. Such machines and structures may have dimensions that prohibit the pre-assembly under factory conditions of the relevant elements, and therefore assembly needs to take place at the installation site. In such instances, some typical modes of fastening (e.g., welding or gluing) are undesirable for several reasons. Execution to the required quality may be difficult due to absence of suitable fixtures, exposure to the environment and challenges in quality assurance, and subsequent post-treatment, such as surface protection may be equally difficult. In other instances, such typical modes of fastening are undesirable even though they may be carried out under factory conditions. Examples include where the materials of the parts to be joined are not suitable for the typical assembly methods, such as when assembling elements made of cast iron (where welding is not possible) or made of certain plastics (where adhesive bonding is not possible). Other examples include where the assembly method itself tends to degrade the properties of the materials to be joined, such as the reduction of fatigue properties of steel when welded.

One preferred fastening method that permits factory and outside-factory assembly is the use of a threaded fastener, such as a bolt, screw, threaded bar or similar, joined with a matching threaded nut or screwed directly into a threaded hole in a part to be assembled. A rigid connection can be achieved, which can be dismantled later as necessary and which does not destroy material properties, surface protection or other key features of the elements to be assembled.

Threaded fasteners that are exposed to a corrosive environment are subject to corrosive attack. This applies to threaded fasteners used in a marine environment, not least threaded fasteners mounted in the splash zone or below the sea surface.

Traditional surface protection methods are often not suitable for use on threaded fasteners used in severely corrosive environments.

Conventional painting does not provide any useful threaded fastener corrosion protection. The high contact stresses under the threaded fastener head and the nut, and in the part of the screw thread loaded during threaded fastener tightening will destroy the surface protection and expose the steel materials to the environment.

Hot-dip galvanizing does generally provide relatively efficient threaded fastener corrosion protection under ordinary outdoors conditions, but it has inherent problems, particularly in marine environments. Hydrogen embrittlement is a permanent threat of hot-dip galvanized threaded fasteners due to the acidic pre-treatment of the steel prior to galvanizing. This particularly applies to high-strength threaded fasteners. In addition, hot-dip galvanized threaded fasteners may be subject to severe, localized corrosive attack caused by the accumulation of water or other electrolytes in the threaded fastener hole which results in the creation of a corrosion cell. Such localized corrosion will often cause rapid failure of the threaded fastener, particularly when exposed to cyclic loading.

The use of threaded fasteners made of corrosion-resistant materials, such as stainless steel, may seem like an obvious solution to the above problems, but this is not the case in reality. Stainless steel threaded fasteners have turned out to be vulnerable to stress corrosion cracking, which occurs when the threaded fasteners are exposed to high tensile stresses under corrosive conditions.

All the above corrosion problems may be highly accelerated if the threaded fastener carries electrical current, as it may happen with splash zone or subsea assemblies of metallic components, or where water or other electrolytes may accumulate. In such case the threaded fastener can be exposed to galvanic corrosion, which is particularly severe and progresses at high speed.

For these reasons threaded fasteners are often considered undesirable for structural component assemblies exposed to severely corrosive environments, such as assembly of offshore structures in the splash zone and subsea.

SUMMARY

An aspect relates to a protection system for a threaded fastener and a method for the installation of such protection system that avoids the above drawbacks of threaded fastener connections exposed to severely corrosive environments.

This aspect is obtained with a protection system being peculiar in that a sealing ring is provided which comprises an inner sealing which seals against the sleeve and an outer sealing which seals against the end cap such that said enclosure forms a cavity which is completely sealed from the environment.

The installations method according to embodiments of the invention is peculiar in that it comprises the following steps: —fitting the threaded fastener into the sleeve, —providing a seal between the sleeve and the end cap or the component and —forming an enclosure around the threaded fastener, comprising the sleeve and either the two end caps, or the one end cap and the one threaded hole, that said enclosure forms a cavity which is completely sealed from the environment.

The inspection method according to embodiments of the invention is peculiar in that the method comprises the following steps: —establishing a pressure in the cavity inside the sleeve that is higher than the ambient pressure and the end cap at a level that is higher than the ambient pressure, —expanding the end cap to a pre-defined dimension or shape as a consequence of the establishment of said pressure that is higher than the ambient pressure and —comparing the actual dimension or shape of the end cap with the pre-defined dimension or shape.

The maintenance method according to embodiments of the invention is peculiar in that the method comprises introducing a fluid substance such as a corrosion-protective substance into the cavity through inlet means or an inlet in the end cap, the sleeve and/or any sealing ring.

The protection system for a threaded fastener according to embodiments of the invention comprises a sleeve which covers the threaded fastener shank and protects the shank and possibly also part of the thread from the environment. At each end of the threaded fastener the sleeve is connected, directly or through one or more intermediary members, to an end cap which covers and protects the part of the threaded fastener that is not covered and protected by the sleeve. The connection is sealed, and the combination of the sleeve and the end cap forms an enclosure that completely protects the threaded fastener against the environment.

The end cap may be a separate part, or it may comprise a closed, threaded hole in one of the components to be assembled.

In a preferred embodiment the sleeve surrounding the threaded fastener shank is a tubular member with a smooth outside that can form a tight seal with an O-ring. The O-ring is mounted in a groove machined into the inner bore of a sealing ring or, alternatively, into the inner bore of a threaded hole in a component. The sealing ring fits as a washer under the threaded fastener head or nut. After tightening, the threaded fastener head or nut is covered with an end cap that can form a tight seal with an O-ring. The O-ring is mounted in a groove machined into the outside of the sealing ring.

As an additional measure against corrosion the components protecting the threaded fastener may be filled with a corrosion-protecting substance, such as a grease providing a heavy, soft film on all surfaces. Alternatively, a humidity-absorbing material, such as silica gel, may be added to the end cap, e.g. as crystals filled into in a satchel made of material permeable to water vapor. The end cap may also be fitted with a compartment capable of containing the humidity-absorbing material.

It is preferred that the inner sealing and the outer sealing is in the form of an O-ring. Other seals than O-ring may be used, e.g., labyrinth seal, V-ring seal, lip seal, ceramic seal etc.

Such use of seals against the sleeve and the end cap provides an efficient and secure sealing of the components.

The main advantage of embodiments of the invention is that, due to the complete sealing between the components protecting the threaded fastener, it will be entirely unaffected by the environment. Thus, it will be possible to use a standard "black" or unprotected threaded fastener irrespective of the environment surrounding the threaded fastener. Standard "black" threaded fasteners combine low cost and high performance. They are available in all material property classes, have lower risk of hydrogen embrittlement and can safely be tightened to a higher stress level than any other threaded fastener type, thereby facilitating low-cost, high-performance threaded fastener assemblies.

In another preferred embodiment the end cap may be fitted with a pressure-balancing device capable of ensuring a certain level of internal pressure relative to the outside pressure. This pressure-balancing device may be established by suitable selection of the shape and/or material of the end cap to obtain an arrangement where the volume of the cap is flexible so that any external pressure gives rise to an approximately equal internal pressure. Pressure balancing will be facilitated by ensuring that cavities inside the protective covering of the threaded fastener, i.e. between the sleeve and the threaded fastener shank, and between the end cap and the threaded fastener head or nut, are filled with an incompressible corrosion-protective fluid or semi-fluid substance, such as protective oil or grease.

One practical embodiment of such pressure-balancing device comprises manufacturing the end cap from an elastomeric material, such as nitrile rubber. Prior to final attachment to the threaded fastener assembly the end cap is filled with an incompressible corrosion-protective substance, e.g. oil or grease. To this inlet means such as a grease nipple may be used. Fitting the end cap over the threaded fastener head or nut will cause the end cap material to stretch somewhat, which in turn will cause the end cap to have a well-defined initial shape.

The embodiments of the invention provide a combination of advantages. The pressure-balancing arrangement means that the protection system can be applied in pressurized environments, such as in pressurized process lines or in subsea installation, without any requirement for the seals to be capable of maintaining sealing at large pressure gradients across the seal. The pressure-balancing arrangement provides a reservoir of corrosion-protective substance ensuring that even in case of leakage over the seal it will take some time before the corrosion-protective substance has been exhausted. At the same time the pressure-balancing arrangement provides direct means for inspection and control of the integrity of the protection system. The inspection may simply be done visually, observing whether the end cap cover is in a position or has a shape that is different from its position or shape after the supplementary filling with the corrosion-protective substance, or it may be done with some remote sensing device, such as a proximity sensor measuring the position or shape of the end cap.

Another practical embodiment of such pressure-balancing device comprises manufacturing the end cap from a metallic material, such as Alloy 625, shaping part of the end cap as a bellows that provides some flexibility. This embodiment permits the supplementary filling of the end cap with additional corrosion-protective substance after fitting of the end cap to the threaded fastener. Because of such supplementary filling the end cap bellows will extend. This extension will provide a combination of effects. Firstly, provided the end cap is made of a material with a certain stiffness, e.g. Alloy 625, it will act as a spring that is extended because of the supplementary filling. The spring force of the bellows when extended will give rise to a small overpressure on the corrosion-protective substance. Since the bellows directly transfers any external pressure to the corrosion-protective substance, this overpressure will be determined only by the stiffness of the bellows and its extension and will be independent of the external pressure. Secondly, in case any corrosion-protective substance leaks out across the seals the internal volume of the corrosion-protective substance will be reduced, and the bellows will contract. Because of this contraction the bellows will gradually reach a position that is different from its position after the supplementary filling with the corrosion-protective substance. The fact that the bellows will reach a position that is different from its position after the supplementary filling with the corrosion-protective substance provides a simple and straightforward means for inspection of the integrity of the protection system for the threaded fastener.

The embodiments of the invention provide a combination of advantages. The pressure-balancing arrangement means that the protection system can be applied in pressurized environments, such as in pressurized process lines or in subsea installation, without any requirement for the seals to be capable of maintaining sealing at large pressure gradients across the seal. The fact that the pressure-balancing arrangement can be extended with a supplementary filling with corrosion-protective substance provides a reservoir of corrosion-protective substance ensuring that even in case of leakage over the seal it will take some time before the corrosion-protective substance has been exhausted. The spring-effect of the bellows will cause the corrosion-protective substance to be under a small, internal overpressure, which will ensure that in case the sealing of the protection system is imperfect, the overpressure on the corrosion-protective substance will cause the corrosion-protective substance to leak outwards across the seals, rather than permitting any ambient substance, such as humid air or water, to leak inwards across the seals. Hence, the integrity of the protection system will be preserved for a long period even in case of an imperfection in the seals. At the same time the pressure-balancing arrangement provides direct means for inspection and control of the integrity of the protection system. The inspection may simply be done visually, observing whether the end cap cover is in a position that is different from its position after the supplementary filling with the corrosion-protective substance, or it may be done with some remote sensing device, such as a proximity sensor measuring the position of the end cap.

In another preferred embodiment the end cap is partly or completely surrounded by a protective cover that is capable of protecting the end cap against mechanical forces and impacts, caused by e.g. being trodden on, or being hit by tools, equipment or falling objects, etc. Such protective cover may be dimensioned to form a boundary or end-stop for the flexible part of the end cap, thereby providing a reference for the assessment of the inspection and control of the integrity of the protection system.

The embodiments of the invention have the advantage that the protective cover can be made to combine a number of useful functions. In the first place, it will protect the end cap against mechanical forces and impacts. In the second place, it can serve as the inspection reference for the original, intact version of the end cap, particularly after the end cap has been expanded to a desired position through the supplementary filling with corrosion-protective substance. In the third place, it can serve as an end stop for the supplementary filling with corrosion-protective substance, thereby preventing that the end cap may be damaged or overly distended by being over-filled with such corrosion-protective substance.

In another preferred embodiment the sleeve surrounding the threaded fastener shank is made of a non-conductive material, such as Glass-fiber Reinforced Polyester (GRP) or a thermoplastic material. At minimum one end of the threaded fastener a non-conducting washer is used in the series of washers, which would typically then comprise i) a non-conducting washer, ii) a sealing ring, and iii) a normal, hardened washer.

The embodiments of the invention have the advantage that the combination of the non-conducting sleeve and the non-conducting washer effectively prevents the threaded fastener from forming a conductive path between the components assembled with the threaded fastener connection. In this way galvanic corrosion of the threaded fastener is prevented.

BRIEF DESCRIPTION

Some of the embodiments will be described in detail, with reference to the following figures, wherein like designations denote like members, wherein.

DETAILED DESCRIPTION

Figure 1:
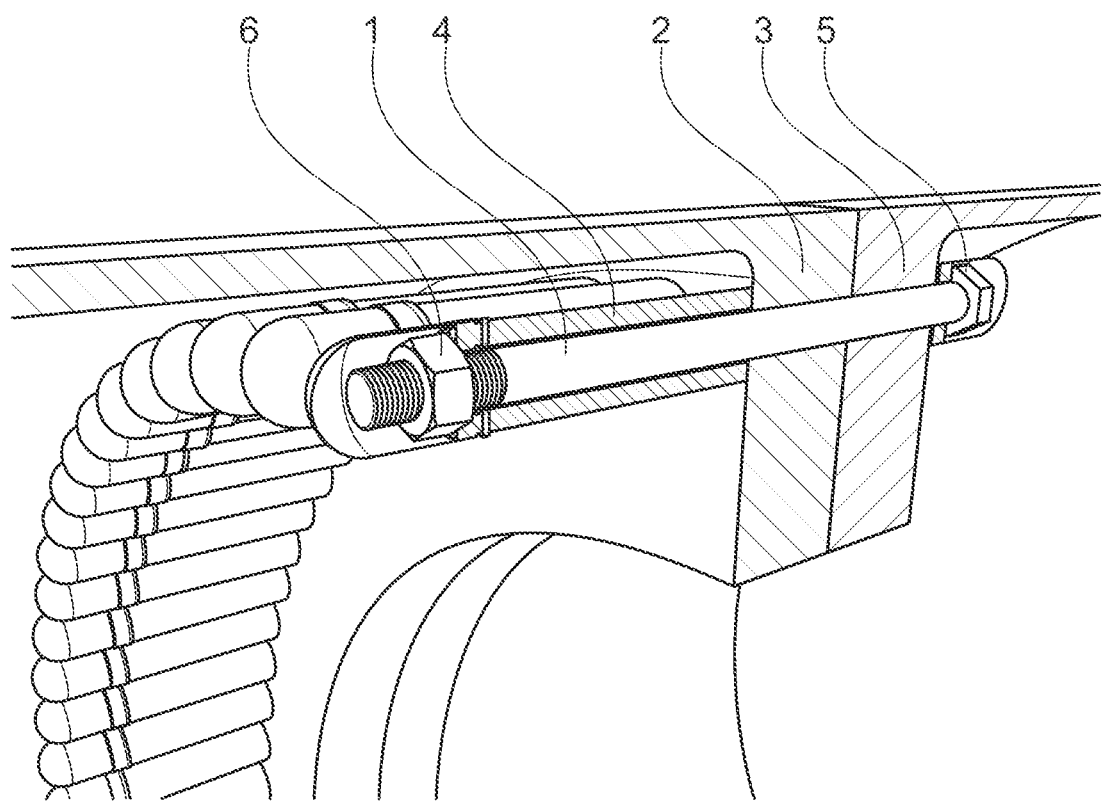
FIG. 1 illustrates a protection system for a threaded fastener according to embodiments of the invention.

In the figures, similar or corresponding elements are denoted with the same reference numerals.

FIG. 1 illustrates a protection system for a threaded fastener according to embodiments of the invention. A threaded fastener 1 is mounted through two flanges 2 and 3. The threaded fastener is fitted with an extender 4 which allows the use of a fastener that is longer than the combined thickness of the flanges, thereby reducing the risk of loss of pretension because of settling of the assembly and relaxation of the materials. At one end the threaded fastener has a head 5 and at the other end a nut 6 is fitted.

Figure 2:
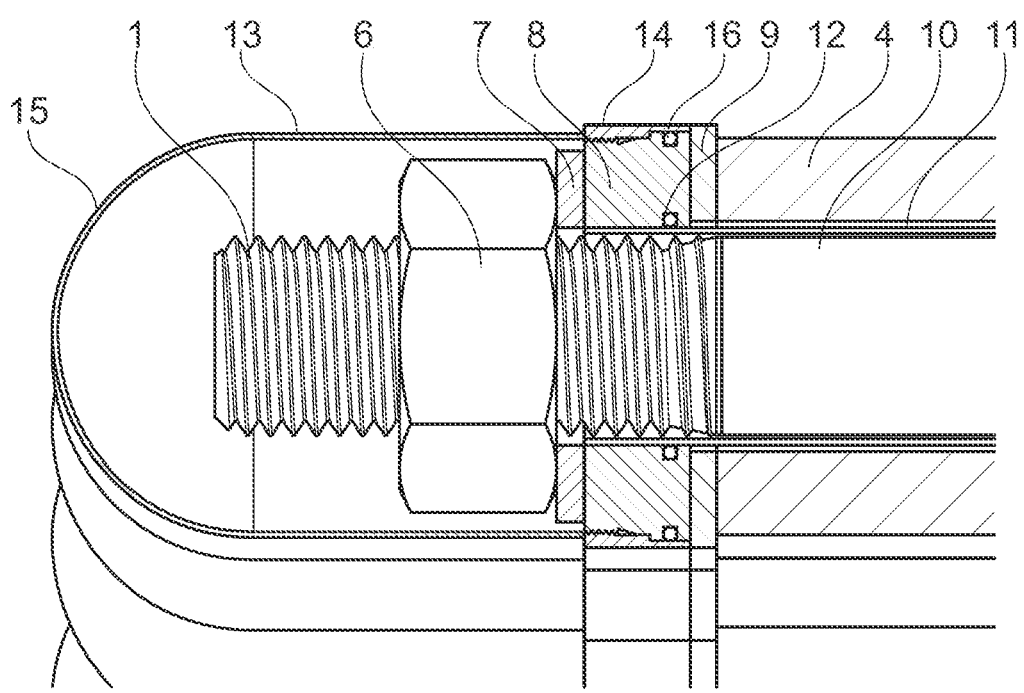
FIG. 2 illustrates the protection system for a threaded fastener depicted in FIG. 1 in more detail.

FIG. 2 illustrates the protection system for a threaded fastener depicted in FIG. 1 in more detail. Under the nut 6 a hardened washer 7 is mounted. The washer 7 rests on a sealing ring 8 and an insulating washer 9, which rests against the extender 4. Around the shank 10 of the fastener 1 an insulating sleeve 11 is fitted. The insulating sleeve 11 fits into an O-ring seal 12 in the sealing ring 8. On the outside of the sealing ring an end cap 13 is fitted. The end cap 13 comprises a threaded ring 14 and an end cap cover 15. The threaded ring 14 forms a seal with an O-ring 16 mounted in the sealing ring 8.

In this arrangement the threaded fastener 1 is completely protected against the environment. Consequently, it may be a "black", unprotected threaded fastener, such as a conventional class 8.8 or 10.9 threaded fastener. Equally, the nut 6 may be a "black", unprotected nut, such as a class 8 or 10 nut, and the hardened washer 7 may also be a simple, "black", unprotected hardened washer made of carbon steel. The sealing ring 8 and the end cap 13 comprising the threaded ring 14 and the end dap cover 15 may be made of a variant of Alloy 625 metal, such as Inconel, or of some other material immune to corrosion. The threaded ring 14 and the end dap cover 15 may be manufactured as separate components, joined by laser welding. The insulating washer 9 and the insulating sleeve 11 may be made of GRP. The O-rings 12 and 16 may be made of nitrile rubber. The cavity 17 inside the end cap 13 and the sleeve 11 may be air-filled, or it may be partly or completely filled with a corrosion-protective substance such as corrosion-protecting oil or grease.

Figure 3:
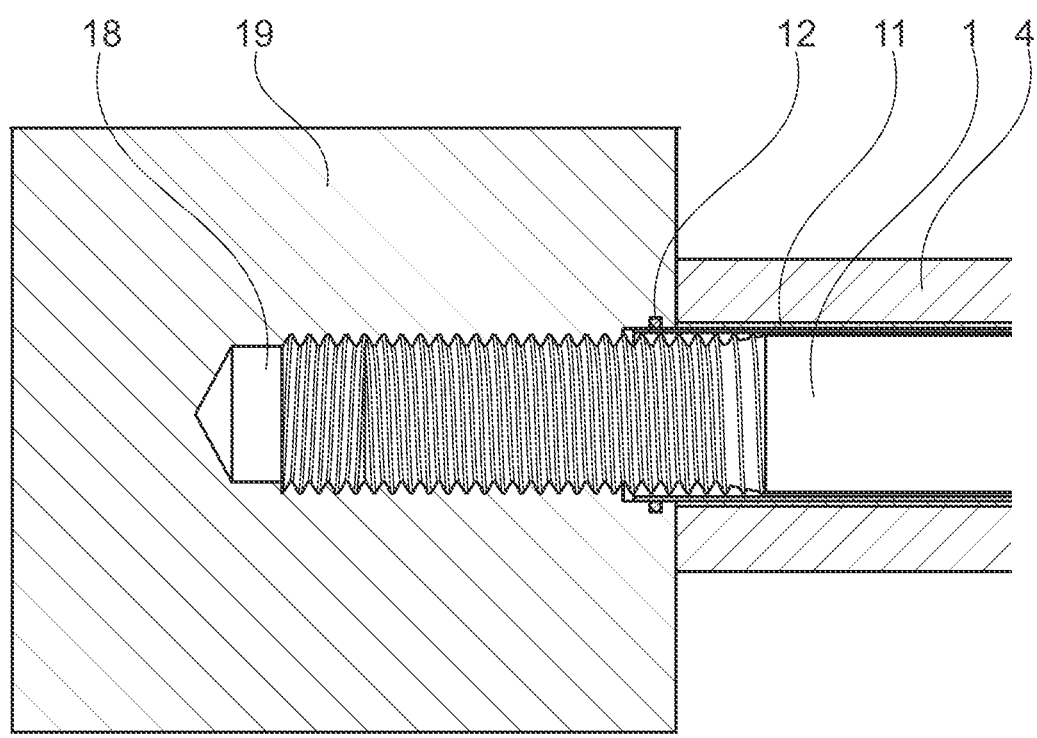
FIG. 3 illustrates an embodiment of the protection system for a threaded fastener as applied when the threaded fastener is installed in a bottom hole.

FIG. 3 illustrates an embodiment of the protection system for a threaded fastener as applied when the fastener is installed in a bottom hole. The fastener 1 is screwed into a threaded hole 18 machined into a component 19, such as a flange. The insulating sleeve 11 fits into an O-ring seal 12 in the component 19.

Figure 4:
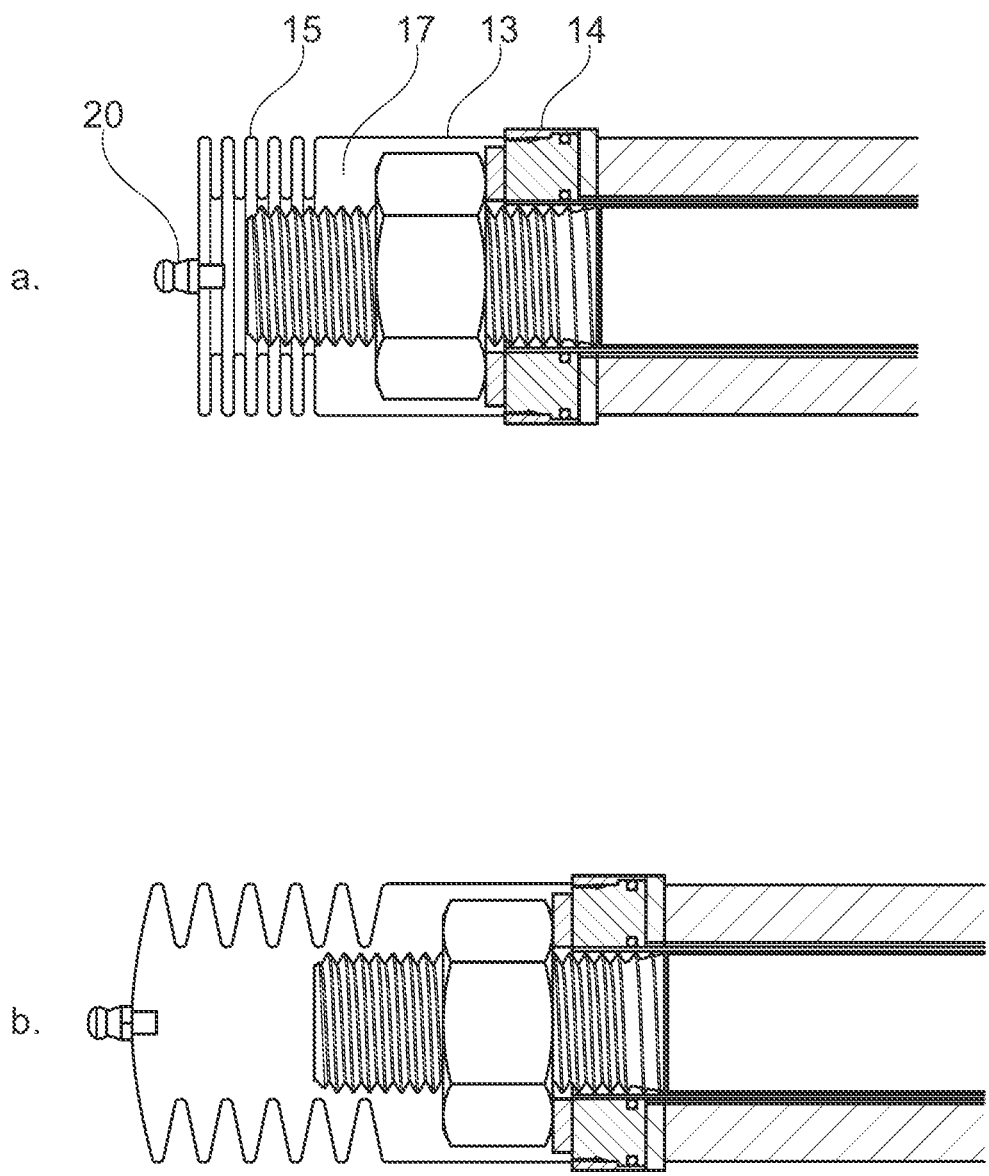
FIG. 4a illustrates an embodiment of the protection system for a threaded fastener with a pressure-balancing feature.
FIG. 4b illustrates an embodiment of the protection system for a threaded fastener with a pressure-balancing feature.

FIG. 4 illustrates an embodiment of the protection system for a threaded fastener with a pressure-balancing feature. Here the end cap 13 comprises a threaded ring 14 and an end cap cover 15 shaped as a bellows. The end cap cover 15 is fitted with a grease nipple 20. FIG. 4.*a* shows the protection system after the threaded ring 14 of the end cap 13 has been fitted to the sealing ring 8 and before any supplementary corrosion-protective substance has been added. The bellow-shaped end cap cover 15 is substantially in its neutral position. FIG. 4.*b* shows the protection system after a desired amount of supplementary corrosion-protective substance has been added through the grease nipple 20. The bellow-shaped end cap cover 15 is now in its extended position, exerting a small pressure on the corrosion-protective substance in the cavity 17.

Figure 5:
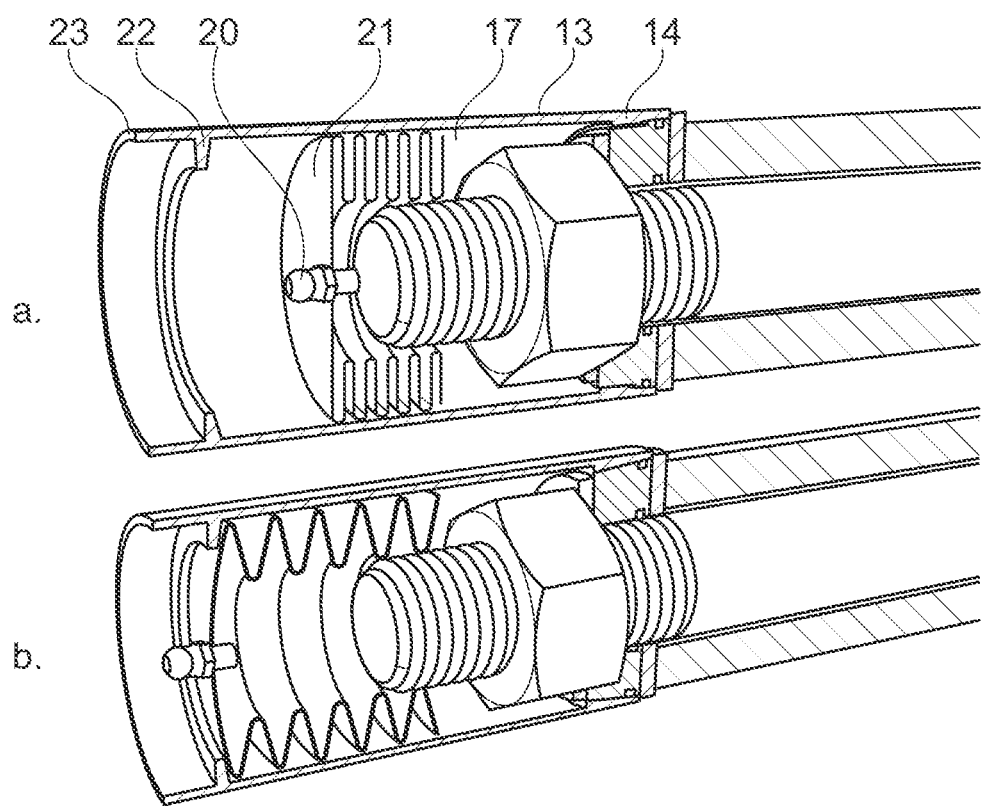
FIG. 5a illustrates an embodiment of the protection system for a threaded fastener with a pressure-balancing feature and supplementary protection.
FIG. 5b illustrates an embodiment of the protection system for a threaded fastener with a pressure-balancing feature.

FIG. 5 illustrates embodiments of the protection system for a threaded fastener with a pressure-balancing feature and supplementary protection, where the supplementary protection is integrated with the end cap. Here the end cap 13 comprises a threaded ring 14, a protective cover in the form of a tubular member 21, and a bellows 22 joined to the inside of the tubular member 21. The tubular member 21 has an internal ring 23 that acts as an end stop for the bellows 22, limiting the extent to which the bellows 22 can extend because of being filled with supplementary corrosion-protective substance through the grease nipple 20. The tubular member 21 extends somewhat beyond the internal ring 23 to a rim 24 that provides protection for the bellows 22 and the grease nipple 20. FIG. 5.*a* shows the protection system after the threaded ring 14 of the end cap 13 has been fitted to the sealing ring 8 and before any supplementary corrosion-protective substance has been added. The bellow 22 is substantially in its neutral position. FIG. 5.*b* shows the protection system after a desired amount of supplementary corrosion-protective substance has been added through the grease nipple 20. The bellow 22 is now in its extended position, resting against the internal ring 23 of the tubular member 21, exerting a small pressure on the corrosion-protective substance in the cavity 17. The condition of the protection system can be readily verified by visual inspection of the position of the grease nipple 20 relative to the internal ring 23 and/or the rim 24 of the tubular member 21.

Figure 6:
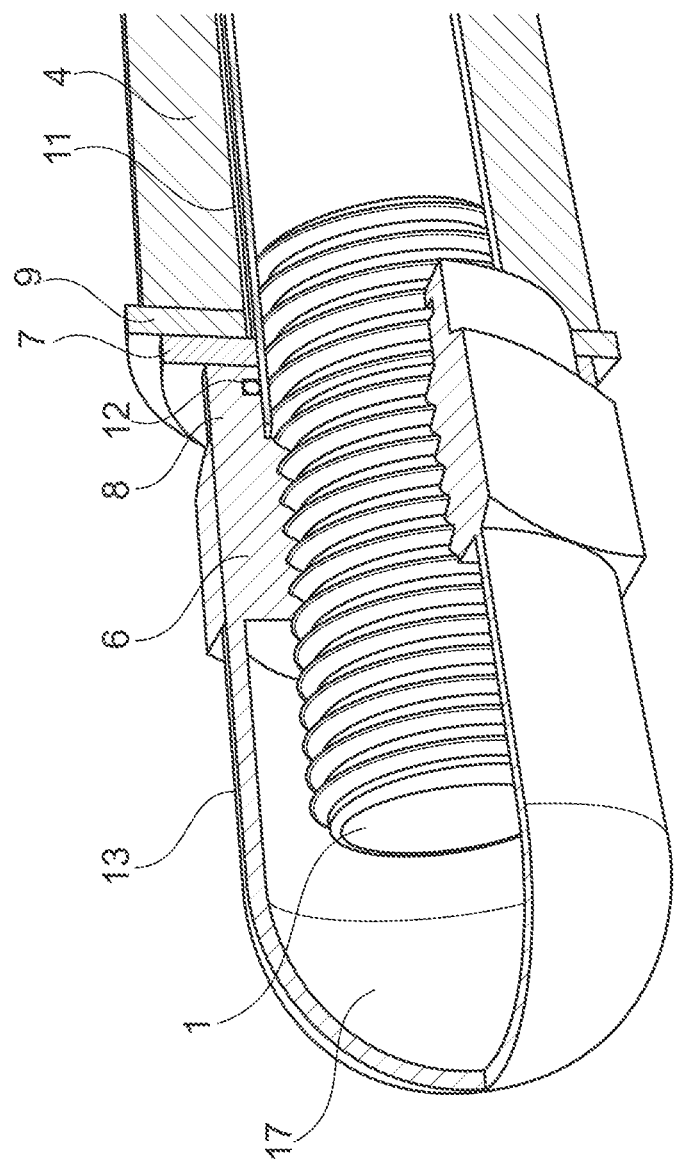
FIG. 6 illustrates an embodiment of the protection system for a threaded fastener with the end cap and the sealing ring integrated with the nut.

FIG. 6 illustrates an embodiment of the protection system for a threaded fastener where the end cap 13 is integrated with the nut 6 and the sealing ring 8. In this embodiment the O-ring 12 which seals against the sleeve 11 is fitted into the integrated sealing ring 8, and the metallic washer 7 rests directly on the insulating washer 9. The cavity 17 may be air-filled or partly or completely filled with another substance, such as a corrosion-protective substance. The end cap 13 may be fitted with a grease nipple 20 (not shown on the drawing).

Figure 7:
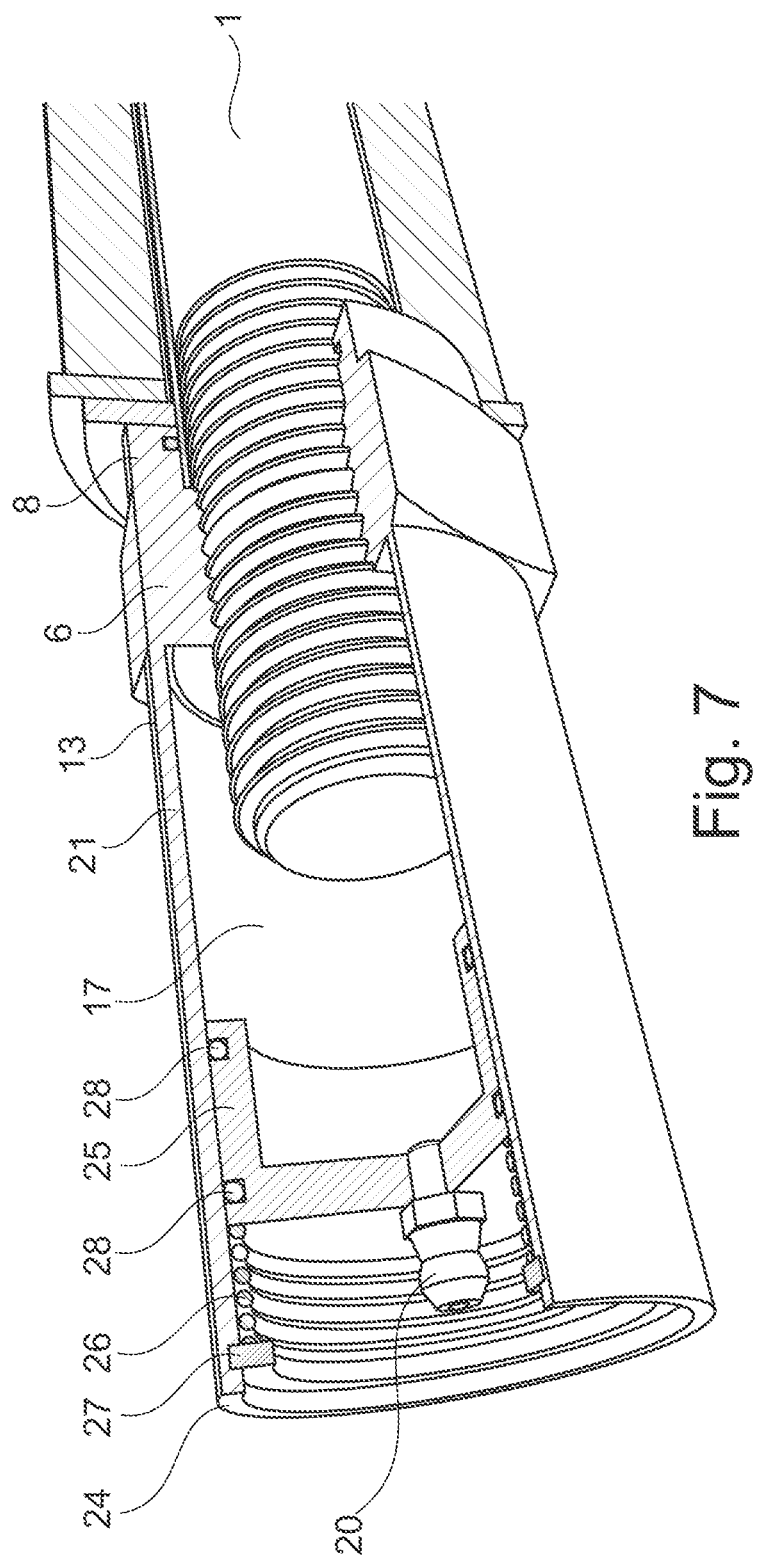
FIG. 7 illustrates an embodiment of the protection system for a threaded fastener with a pressure-balancing feature and supplementary protection and where the end cap and the sealing ring are integrated with the nut.

FIG. 7 illustrates an embodiment of the protection system for a threaded fastener where the end cap 13 is integrated with the nut 6 and the sealing ring 8, and which has pressure compensation. In this embodiment the end cap 13 is integrated with a protective cylinder 21 that is extended to form a rim 24 that provides protection for a piston 25 fitted with a grease nipple 20. The piston 25 is pushed towards the end face of the nut 6 by a spring 26 kept in place by a locking ring 27. The piston is sealed against the inside of the cylinder 21 by two O-rings 28. The force from the spring 26 maintains an overpressure on a corrosion-protective substance in the cavity 17. After the nut 6 has been tightened on the fastener 1 supplementary corrosion-protective substance has been added through the grease nipple 20 until the spring 26 has been pressed to its fully compressed position. The condition of the protection system can be readily verified by visual inspection of the position of the grease nipple 20 relative to the rim 24 of the cylindrical part 21 of the end cap 13.

In the following several constructional details are specified for the protection system.

The pressure in the cavity (17) inside the sleeve (11) and the end cap (13) is maintained at a level that is higher than the ambient pressure.

The elastic, spring-like properties of the end cap (13) are used to maintain the pressure in the cavity (17) inside the sleeve (11) and the end cap (13) at a level that is higher than the ambient pressure.

The elastic properties of mechanical or gaseous springs are used to maintain the pressure in the cavity (17) inside the sleeve (11) and the end cap (13) at a level that is higher than the ambient pressure.

The end cap (13) is partly or completed surrounded by a protective cover (21).

The protective cover (21) is integrated with the end cap (13).

The protective cover (21) is used to maintain the sealing and position of the end cap (13).

The protective cover (21) provides an end stop (23) for the flexible part of the end cap (13).

In the following several specific steps are specified for the method.

A pressure in the cavity (17) inside the sleeve (11) and the end cap (13) is established at a level that is higher than the ambient pressure.

The pressure in the cavity (17) inside the sleeve (11) and the end cap (13) is established by the introduction of a fluid substance such as a corrosion-protective substance into the cavity (17) through inlet means in the end cap (13), the sleeve (11) and/or any sealing ring (8).

Increasing the pressure in the cavity (17) inside the sleeve (11) and the end cap (13) to a level that expands the end cap (13) to a pre-defined dimension or shape.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A protection system for a threaded fastener, the protection system comprising:
    a threaded fastener comprising a shank, a first end, and a second,
    a sleeve, and either
    two end caps covering the first end and the second end, or
    one end cap covering the first end and one component with a threaded bottom hole into which the second end of the threaded fastener is screwed, the one component being different from a nut,
    wherein the sleeve together with either the two end caps, or together with the one end cap and the threaded bottom hole of the one component, form an enclosure around the threaded fastener, wherein a sealing ring is provided, the sealing ring comprising an inner O-ring and an outer O-ring, the outer O-ring having a larger diameter than the inner O-ring, wherein the inner O-ring extends around the sleeve in abutment with the sleeve for forming an inner sealing that seals against the sleeve and wherein the outer O-ring forms an outer sealing that seals the sealing ring against a respective end cap such that the enclosure forms a cavity completely sealed from an environment.

2. The protection system for a threaded fastener according to claim 1, wherein the cavity is partly or completely filled with a corrosion-protective substance, wherein said corrosion-protective substance is a corrosion-protecting oil or grease.

3. The protection system for a threaded fastener according to claim 1, wherein the shape and/or material of part of or the whole respective end cap is sufficiently flexible to ensure that any external pressure gives rise to an approximately equal internal pressure.

4. The protection system for a threaded fastener according to claim 1, wherein part of or the whole respective end cap is shaped as a bellows.

5. The protection system for a threaded fastener according to claim 1, wherein part of or the whole respective end cap is manufactured from an elastomeric material.

6. The protection system for a threaded fastener according to claim 1, wherein at least one of the respective end cap, the sleeve and the sealing ring is fitted with an inlet, wherein the inlet is a grease nipple for the filling with a corrosion-protective substance.

7. The protection system for a threaded fastener according to claim 1, wherein there is provided a washer around the sleeve at an end of the threaded fastener, wherein the sleeve and the washer are electrically insulating.

8. The protection system for a threaded fastener according to claim 1, wherein the sealing ring comprising an inner groove in which the inner O-ring is provided and an outer groove in which the outer O-ring is provided.

9. The protection system for a threaded fastener according to claim 1, wherein the sealing ring comprises an outer threading and the end cap comprises a corresponding inner threading, wherein the inner threading is screwed onto the outer threading of the sealing ring for fastening the end cap onto the sealing ring.

10. A method for mounting of a protection system for a threaded fastener, the protection system comprising
    a threaded fastener including a shank, a first end, and a second end,
    a sleeve, and either
    two end caps for covering the first end and the second end, or
    one end cap for covering the first end and one component with a threaded bottom hole into which the second end of the fastener is screwed, the one component being different from a nut, wherein the method comprises the following steps:
    fitting the threaded fastener into the sleeve;
    providing a sealing ring between the sleeve and a respective end cap, wherein the sealing ring comprises an inner O-ring and an outer O-ring, the outer O-ring having a larger diameter than the inner O-ring; wherein the inner O-ring extends around the sleeve in abutment with the sleeve for forming an inner sealing that seals the sealing ring against the sleeve and wherein the outer O-ring forms an outer sealing that seals the sealing ring against the respective end cap; and
    forming an enclosure around the threaded fastener, the enclosure comprising the sleeve and either the two end caps or the one end cap and the threaded bottom hole of the one component, such that the enclosure forms a completely sealed from an environment.

11. A protection system for a threaded fastener, wherein the threaded fastener comprises a first threading at a first end of the fastener, and a threaded nut screwed onto the first threading; wherein the protection system comprises:
    a cylindrical sleeve provided around a shank but not extending around the threaded nut, the cylindrical sleeve having an outer cylindrical surface;
    an end cap having a cavity accommodating the first end and the threaded nut;
    an inner O-ring provided between the end cap and the cylindrical sleeve and extending around the cylindrical sleeve in abutment with an outer cylindrical surface for forming an inner sealing that seals the end cap against the cylindrical sleeve;
    wherein the protection system comprises a sealing ring, wherein the sealing ring comprises the inner O-ring and an outer O-ring, the outer O-ring having a larger diameter than the inner O-ring; wherein the inner O-ring forms an inner sealing that seals the sealing ring against the cylindrical sleeve and wherein the outer O-ring forms an outer sealing that seals the sealing ring against the end cap.

12. The protection system for a threaded fastener according to claim 11, wherein the sealing ring comprises an inner groove in which the inner O-ring is provided and an outer groove in which the outer O-ring is provided, the outer groove and the outer O-ring having a larger diameter than the inner groove and the inner O-ring.

13. The protection system for a threaded fastener according to claim 11, wherein the sealing ring comprises an outer threading and the end cap comprises an inner threading, wherein the inner threading is screwed onto the outer threading of the sealing ring for fastening the end cap onto the sealing ring.

14. The protection system for a threaded fastener according to claim 11, wherein the cylindrical sleeve is electrically insulating, and wherein the protection system further comprises an electrically insulating washer abutting the sealing ring on an opposite side of the sealing ring relative to the end cap.

* * * * *